May 21, 1929.  G. W. DOOLEY  1,713,891

MEASURE INDICATOR

Filed April 26, 1927

INVENTOR
George W. Dooley
John A. Naismith
ATTORNEY

Patented May 21, 1929.

1,713,891

UNITED STATES PATENT OFFICE.

GEORGE W. DOOLEY, OF SAN JOSE, CALIFORNIA.

MEASURE INDICATOR.

Application filed April 26, 1927. Serial No. 186,738.

The present invention relates to a device that may be slidably mounted upon a measuring tape, a yard stick, or similar device for indicating a given measure.

It is one object of the present invention to provide a device of the character indicated that may be quickly, easily and accurately adjusted on a measure.

It is another object of the invention to provide a device of the character indicated that will be simple in form and construction, economical to manufacture, and highly efficient in its practical application.

It is still another object of the invention to provide a device of the character indicated so constructed and arranged as to be applicable to a measure from either end.

Figure 2:
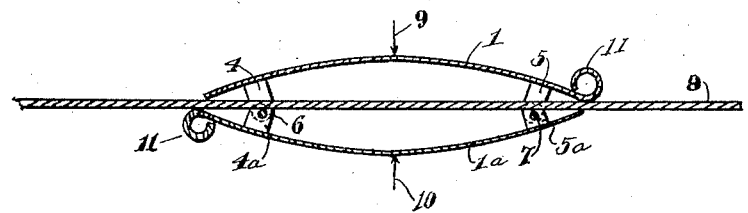
Figure 2 is a longitudinal section through a modification embodying my invention with crayon holders formed thereon.
Figure 1:
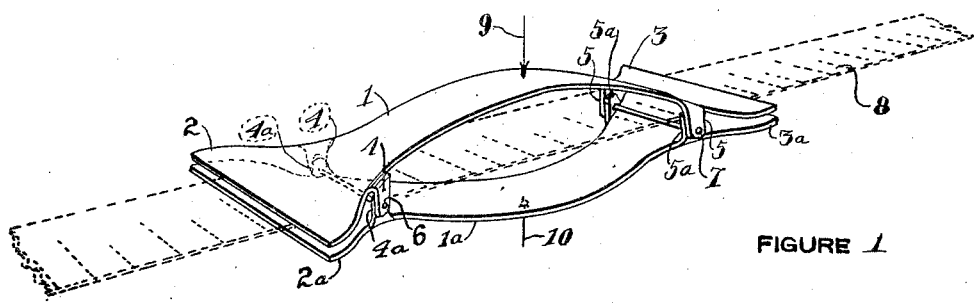
Figure 1 is a perspective illustration of a device embodying my invention.

Referring now more particularly to the drawing, I show at 1 a short strip of spring metal widening out somewhat at each end as indicated at 2 and 3.

On each side of the strip 1 and adjacent each end thereof are formed ears 4—4 and 5—5, these ears being turned at right angles to the strip and all in the same direction.

At $1^a$, $2^a$, $3^a$, $4^a$—$4^a$, $5^a$—$5^a$, is shown another element identical in material and form with the first described element except that the ears $4^a$—$4^a$ and $5^a$—$5^a$ are somewhat shorter.

In assembling the device the two elements are arranged in opposed relation to each other as shown, and pins as 6 and 7 are passed through the engaging ears to form pivots or bearings therefor. By making the ears of different lengths as set forth the pins are positioned below the plane of the tape 8 so that the same may pass smoothly therethrough.

It is obvious now, that when the device is assembled as set forth and pressure is applied thereto as indicated by the arrows 9 and 10 the two ends of the device will be spread a distance so that it may be readily slipped upon the tape. The moment the pressure is removed the resiliency of the parts 1 and 2 cause the two ends to clasp the tape firmly.

The jaws formed by the cooperating ends 2—$2^a$ and 3—$3^a$ may be made of any suitable material and made in any desired shape and spaced to any desired degree to engage large or small tapes or rigid or flexible measures of any kind.

In Figure 2 a form of the invention is shown wherein loops as 11 are formed upon parts 1 and $1^a$ as shown to function as crayon holders whereby a mark may be readily made upon the goods being measured.

It is to be understood, of course, that while I have herein shown and described but one specific embodiment of the invention, changes in form, construction, material, proportions, and method of assembly and operation may be made within the scope of the appended claims.

I claim:

1. A device of the character described comprising a pair of opposed and oppositely and outwardly bowed resilient elements spaced apart at their centers and fulcrumed upon each other at points adjacent their ends to form oppositely directed terminal jaws.

2. A device of the character described comprising a pair of opposed oppositely bowed resilient elements having overlapping ears formed thereon adjacent their opposing ends, the ears on one element being longer than the ears on the other element, and pivotal connections between each pair of overlapping ears.

GEORGE W. DOOLEY.